US009313631B2

(12) United States Patent
Dudai et al.

(10) Patent No.: US 9,313,631 B2
(45) Date of Patent: Apr. 12, 2016

(54) METHOD AND SYSTEM FOR INTELLIGENT CALL TERMINATION

(71) Applicant: VONAGE BUSINESS INC., Atlanta, GA (US)

(72) Inventors: Sagi Dudai, Tel-Aviv (IL); Dany Orr, Tel-Aviv (IL)

(73) Assignee: Vonage Business Inc., Atlanta, GA (US)

( * ) Notice: Subject to any disclaimer, the term of this patent is extended or adjusted under 35 U.S.C. 154(b) by 74 days.

(21) Appl. No.: 14/133,854

(22) Filed: Dec. 19, 2013

(65) Prior Publication Data

US 2015/0181397 A1 Jun. 25, 2015

(51) Int. Cl.
| H04M 11/00 | (2006.01) |
| H04W 4/16 | (2009.01) |
| H04M 3/42 | (2006.01) |
| H04W 76/02 | (2009.01) |
| H04Q 3/00 | (2006.01) |

(52) U.S. Cl.
CPC ........ *H04W 4/16* (2013.01); *H04M 3/42* (2013.01); *H04M 3/4211* (2013.01); *H04M 3/42102* (2013.01); *H04M 3/42263* (2013.01); *H04M 2203/551* (2013.01); *H04Q 3/00* (2013.01); *H04W 76/02* (2013.01)

(58) Field of Classification Search
CPC ......... H04W 60/00; H04W 4/24; H04W 4/16; H04W 76/02; H04M 3/42102; H04M 3/42; H04M 3/42263; H04M 3/4211; H04M 2203/551; H04Q 3/00
See application file for complete search history.

(56) References Cited

U.S. PATENT DOCUMENTS

| 7,924,989 | B1 * | 4/2011 | Cooper ...................... 379/93.09 |
| 8,185,159 | B2 * | 5/2012 | Itamiya et al. ................ 455/561 |
| 8,848,879 | B1 | 9/2014 | Coughlan et al. |
| 2007/0047695 | A1 | 3/2007 | Tal et al. |
| 2009/0257576 | A1 | 10/2009 | Wellard et al. |
| 2009/0279683 | A1 | 11/2009 | Gisby et al. |
| 2010/0111281 | A1 | 5/2010 | Levine |
| 2010/0290455 | A1 | 11/2010 | Erickson et al. |
| 2012/0224681 | A1 | 9/2012 | Desai et al. |

FOREIGN PATENT DOCUMENTS

WO   WO2015/095578 A1   6/2015

OTHER PUBLICATIONS

PCT International Search Report and Written Opinion for PCT/US2014/071248 dated May 20, 2015, 11 pgs.
International Search Report and Written Opinion mailed Jan. 18, 2016 for Application No. PCT/US2015/052646, 12 pages.

* cited by examiner

*Primary Examiner* — Ajit Patel
(74) *Attorney, Agent, or Firm* — Moser Taboada; Joseph Pagnotta (57) ABSTRACT

Methods and systems for intelligently terminating calls are provided herein. In some embodiments, a method for intelligently terminating calls may include receiving a call request directed to a communication identifier associated with a first user, determining a call termination action to associate with the call request based on (a) information associated with the call request and (b) previous call termination patterns associated with the first user, and terminating the call to one or more devices associated with the communication identifier based on the determined call termination action.

19 Claims, 8 Drawing Sheets

METHOD AND SYSTEM FOR INTELLIGENT CALL TERMINATION

BACKGROUND

1. Field

Embodiments of the present invention generally relate to methods and systems that observe and determine individual behavioral patterns for answering calls, and that use those patterns to intelligently terminate calls.

2. Description of the Related Art

Generally, default call termination behavior is similar for all calls to a called device. Typically, the called device rings for a certain amount of time, then either goes to voicemail or disconnects the call attempt if it's not answered. For example, the ring duration may be between 10 to 40 seconds. However, treating each call the same is not efficient as ring durations may be very different depending on the called party's preferences. Some people answer quickly while others let the phone ring and never answer. Some never answer during work hours, while others never answer during off work hours.

The disparity between a fixed ring duration and variable real-life call termination patterns creates inefficiencies. For example, some calls could have been connected but fail to be connected because the ring terminated too quickly; the network resources are busy trying to reach the destination for a fixed duration of time resulting in a waste of network resources; a caller may waste time having to wait for long periods of time if the called party will never answer the call anyway; redundant calls when the caller will need to call back to try again to reach the called party; and the like.

In addition, some technologies support signaling to multiple destinations. That is, multiple devices may be associated with a single phone number or other communication identifier. In some situations a primary/preferred destination may be predefined, for example, GSM defines primary and secondary destinations. However, there may not be a single preferred device/destination for all situations since the preferred device for a call may change depending on various conditions/information associated with the call and the user.

Accordingly, there exists a need in the art for more intelligent and contextually aware termination methods and systems that observe and determine individual behavioral patterns for terminating calls.

SUMMARY

Methods and systems for intelligently terminating calls are provided herein. In some embodiments, a method for intelligently terminating calls may include receiving a call request directed to a communication identifier associated with a first user, determining a call termination action to associate with the call request based on (a) information associated with the call request and (b) previous call termination patterns associated with the first user, and terminating the call to one or more devices associated with the communication identifier based on the determined call termination action.

In some embodiments, a system for intelligently terminating calls may include a call pattern analysis module configured to determine call termination patterns of a first user based on past call history records associated with the first user, a rules creation module configured to create one or more rules based on the call termination patterns determined by the call pattern analysis module, and a call processing module configured to determine a call termination action for a received call request directed towards a device associated with the first user based on (a) information associated with the call request and (b) the one or more rules created.

In some embodiments, a non-transient computer readable medium for storing computer instructions that, when executed by at least one processor causes the at least one processor to perform a method for intelligently terminating calls, may include receiving a call request to establish a call to a first device of a first user, determining a call termination action to associate with the call request based on (a) information associated with the call request and (b) previous call termination patterns associated with the first user, and terminating the call to the first device of the first user using the determined call termination action.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to methods and systems that observe and determine individual behavioral patterns for answering calls. More specifically, embodiments of the present invention may advantageously learn a user's preferences for terminating a call based on caller information, call time, user location, user device information, and other parameters. Individual call termination patterns for subscribers may be analyzed to intelligently determine how to terminate the call, if at all. Some embodiments of the present invention may analyze general patterns or patterns specific to time of day, specific callers, specific devices used, or other parameters, and modify call handling behaviors over time.

In embodiments consistent with the present invention, a telecommunication network may collect statistical data for callers that can be used to determine call termination patterns for specific users that allow their data to be collected. The data collected for each subscriber may be in-band from the call itself, such as caller identification, time of day, user devices available for call termination, and the like, or the data collected may be out-of-band from sources such as social media, external GPS information, information from external calendar sources associated with the called party, and the like.

The user may choose to opt into the intelligent call termination service or select a default termination behavior. Once the intelligent call termination service is activated, call termination rules, such as for example ring duration, will be applied automatically by the system per each individual call. For example, if a subscriber that activates the intelligent call termination service never answers calls after midnight, the service may send the call directly to voicemail or may set a minimal ring and ring back duration (e.g., 1 second). Alternatively, a detailed message to the caller may be given (e.g., "The call was terminated because the called party does not take calls at this time."). In other embodiments, one or a plurality of devices associated with a user's communication identifier (e.g., a phone number) may be automatically selected as the termination device based on past user call termination behavior associated with each device. In some embodiments, call history and user termination behavior may be saved regardless of whether or not the user subscribes to the intelligent call termination service. In other embodiments, call history and user termination behavior is only saved/updated if the user has subscribed to the intelligent call termination service.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

Figure 1:
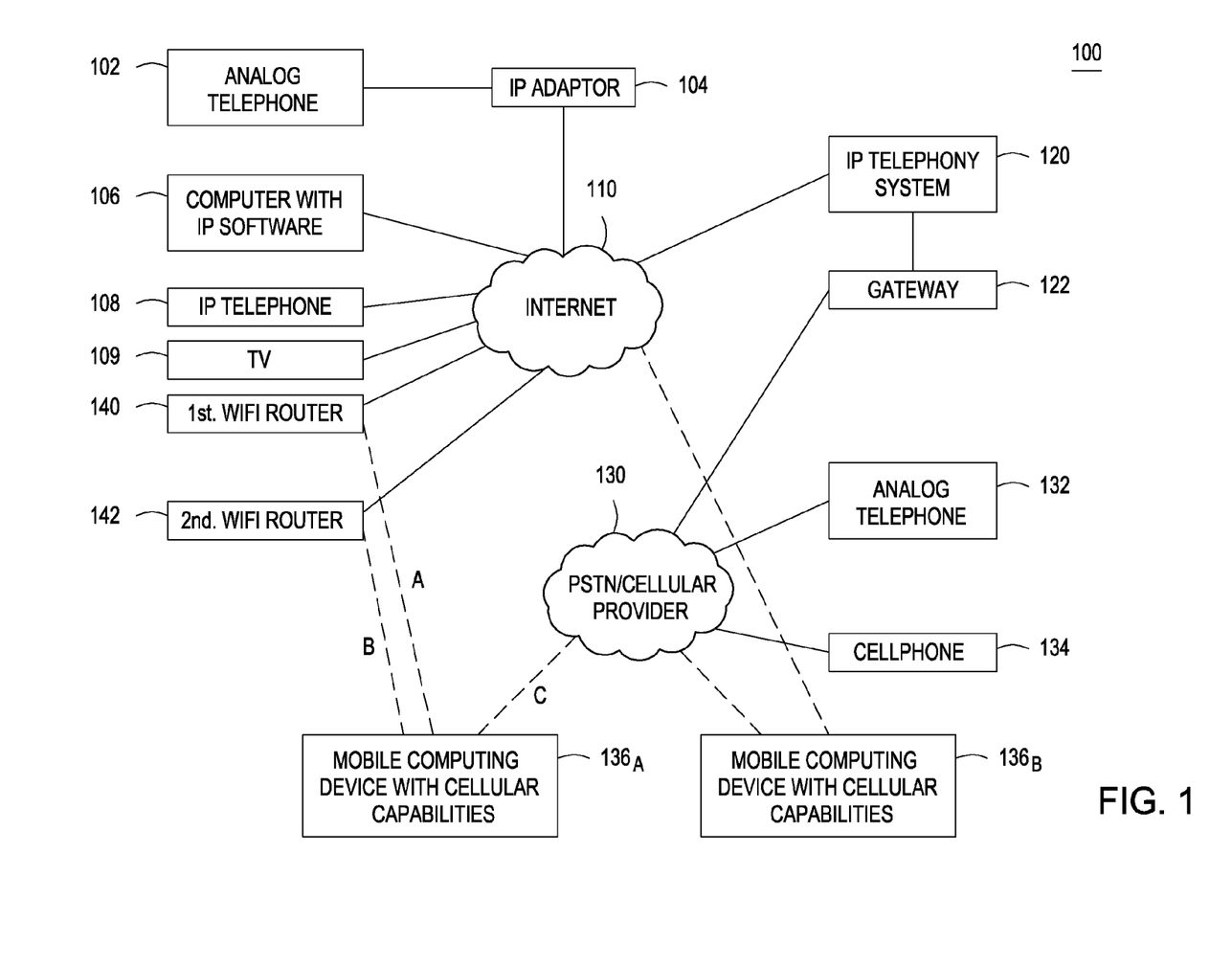
FIG. 1 depicts a block diagram of a telecommunication network, according to one or more embodiments of the invention.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 or a television 109 to place and receive IP based telephone calls, and to access other IP telephony systems (not shown). The computer 106 may be a personal computer (PC), a tablet device, a gaming system, and the like. In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities $136_A$ (e.g., a smartphone) is capable of establishing a first wireless data connection A with a first wireless access point 140, such as a WiFi or WiMax router. The first wireless access point 140 is coupled to the Internet 110. Thus, the mobile computing device $136_A$ can establish a VOIP telephone call with the IP telephony system 120 via a path through the Internet 110 and the first wireless access point 140.

FIG. 1 also illustrates that the mobile computing device $136_A$ can establish a second wireless data connection B with a second wireless access point 142 that is also coupled to the Internet 110. Further, the mobile computing device $136_A$ can establish either a third wireless data connection C via a packet-switch network provided by a cellular service provider 130 using its cellular telephone capabilities, or establish a voice based session telephone call via a circuit-switched network provided by a cellular service provider 130. The mobile computing device $136_A$ could also establish a VoIP telephone call with the IP telephony system 120 via the second wireless connection B or the third wireless connection C.

Although not illustrated in FIG. 1, the mobile computing device $136_A$ may be capable of establishing a wireless data connection to a data network, such as the Internet 110, via alternate means. For example, the mobile computing device $136_A$ might link to some other type of wireless interface using an alternate communication protocol, such as the WIMAX standard.

Similarly, mobile computing device with cellular capabilities $136_B$ may also be coupled to internet 110 and/or cellular service provider 130. In some embodiments, mobile computing device $136_B$ may be connected to internet 110 via a WIFI or WIMAX connection, and the like, and can also establish a VOIP telephone calls with the IP telephony system 120 similar to mobile computing device $136_A$. In embodiments of the present invention, communications environment 100 may be used to establish voice based or data based telecommunications sessions between mobile computing device $136_A$ and mobile computing device $136_B$, depending on various criteria associated with each of the mobile computing devices, as will be described below in more detail.

Figure 2:
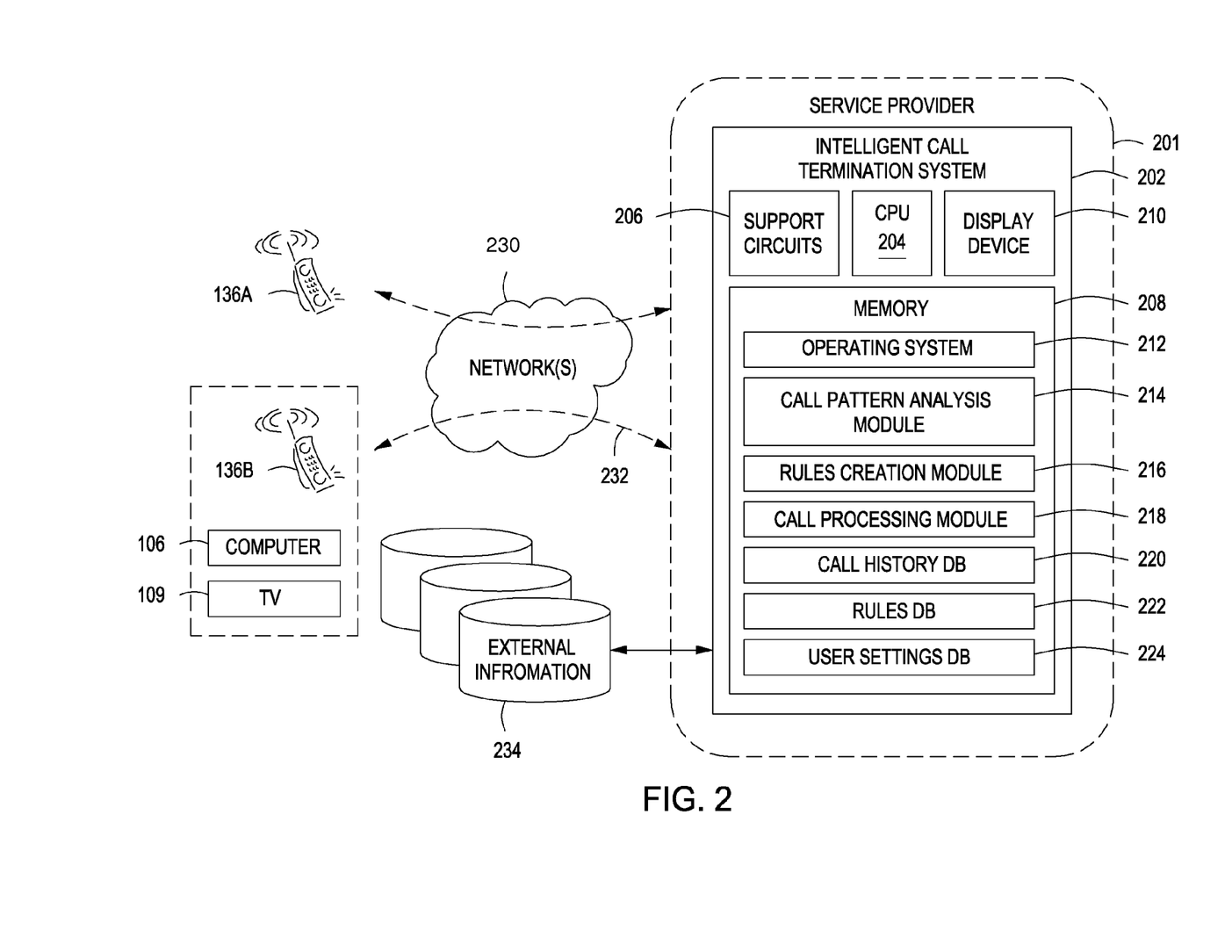
FIG. 2 depicts a block diagram of a system for providing intelligent termination of calls based on a user's call history, according to one or more embodiments of the invention.

As shown in FIG. 2, in some embodiments a service provider backend system 201 (such as, for example, IP telephony system 120 or PSTN 130) may include an intelligent call termination system (ICTS) 202 for determining how to terminate calls to subscriber end user devices (e.g., mobile computing device $136_B$, computer 106, TV 109, and the like) based on a subscriber's past call termination patterns. Specifically, the intelligent call termination system 202 may determine how to terminate calls to a subscriber using rules based on subscriber's past call termination patterns, the current call information 230 (i.e., in-band information), external information 234 (i.e., out-of-band information), and the user's settings/preferences. The intelligent call termination system 202 comprises a Central Processing Unit (CPU) 204, support circuits 206, memory 208, and, in some embodiments, a display device 210. The CPU 204 may comprise one or more commercially available microprocessors or microcontrollers that facilitate data processing and storage. The various support circuits 206 facilitate the operation of the CPU 204 and include one or more clock circuits, power supplies, cache, input/output circuits, and the like. The memory 208 comprises at least one of Read Only Memory (ROM), Random Access Memory (RAM), disk drive storage, optical storage, removable storage and/or the like. In some embodiments, the memory 208 comprises an operating system 212, call pattern analysis module 214, rules creation module 216, call processing module 218, call history database 220, rules database 222, and a user settings database 224.

The operating system (OS) 212 generally manages various computer resources (e.g., network resources, file processors, and/or the like). The operating system 212 is configured to execute operations on one or more hardware and/or software modules, such as Network Interface Cards (NICs), hard disks, virtualization layers, firewalls and/or the like. Examples of the operating system 212 may include, but are not limited to, LINUX, MAC OSX, BSD, UNIX, MICROSOFT WINDOWS, IOS, ANDROID and the like.

Although call history database 220, rules database 222, and a user settings database 224 are shown as being included in memory 208, those of ordinary skill in the art will recognize these elements may be implemented as separate databases coupled to the intelligent call termination system 202. In addition, although call pattern analysis module 214, rules creation module 216, call processing module 218 are shown as being included in memory 208, those of ordinary skill in the art will recognize these elements may be implemented as separate systems communicatively coupled to the intelligent call termination system 202.

Figure 3:
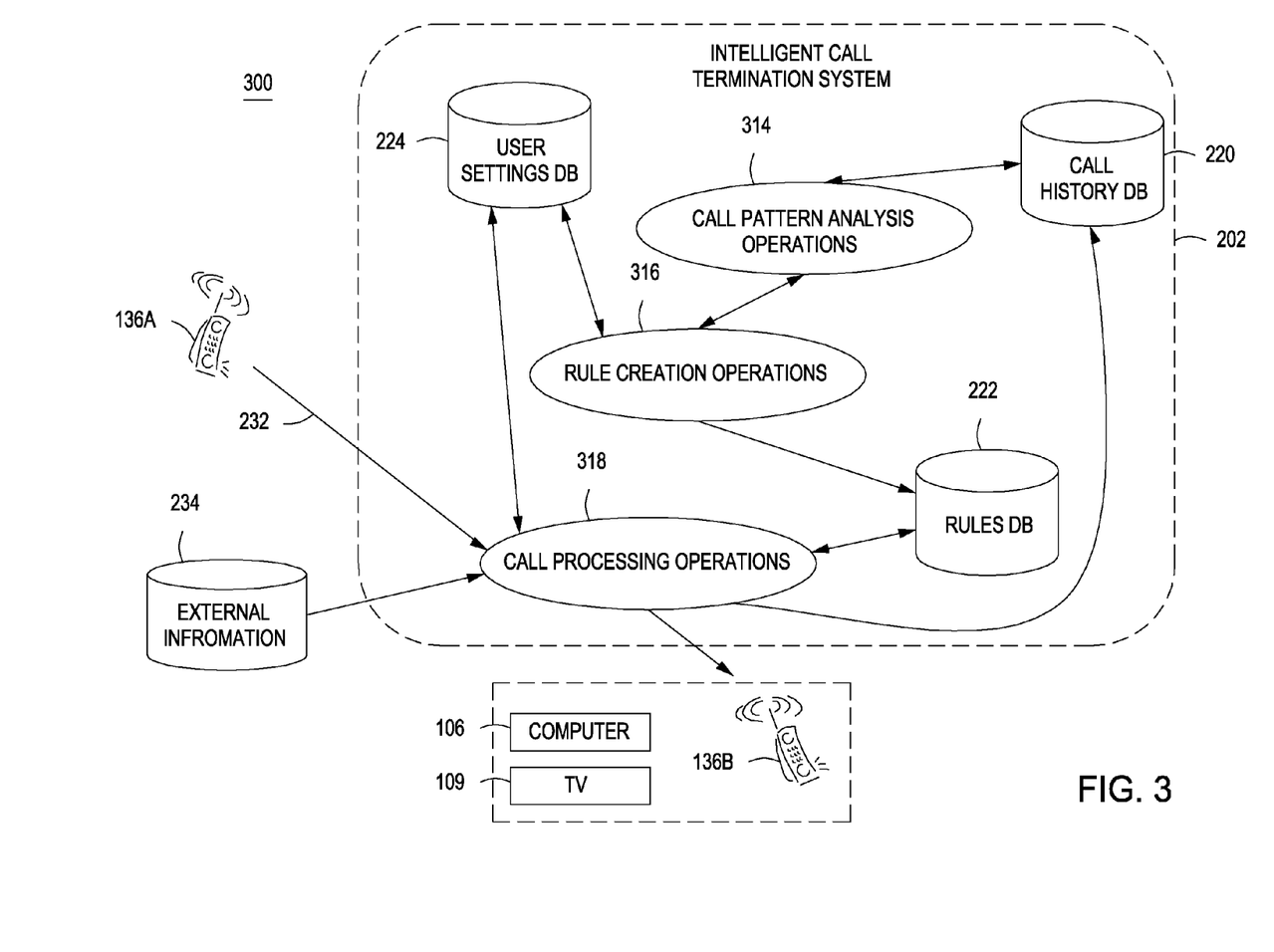
FIG. 3 is a bubble chart of operations according to one or more embodiments, such as the one in FIG. 2.

FIG. 3 is a bubble chart 300 of operations of the intelligent call termination system 202 in accordance with the embodiments of FIG. 2.

Intelligent call termination services will be provided to users who have opted into the service. If the user has opted into the intelligent call termination service, a profile will be created for them in user settings database 224. Once opted in, the user may set their preferences on how various calls should be terminated. Users may also be able to disable, or otherwise override, the call termination service at any time.

Once a user is subscribed to the intelligent call termination service, the history of their calls will be stored in call history database 220. In some embodiments, call history and user termination behavior may be saved for all users receiving calls, regardless of whether or not the user subscribes to the intelligent call termination service. The call history database 220 will include detailed information about each call terminated to the user. For example, some non-limiting examples of the information associated with each call terminated to the user may include times of calls, location of calls, caller information, ring duration before answering the call, whether the call was answered or not, whether the call was sent directly to voicemail, a device identifier of the device that the call was terminated to and/or answered by the user, and the like.

Call pattern analysis operations 314 may be performed on call history records from call history database 220 for a subscribed user to determine call termination patterns and behaviors of the user. Call pattern analysis operations 314 may be performed, for example, by call pattern analysis module 214. For example, call pattern analysis operations 314 may include determining that the user never answers the phone past 12:00 AM unless it is a business call (i.e., from a caller identified as a business contact).

Call pattern analysis operations 314 may provide the determined call termination patterns and behaviors of the user to rules creation operations 316. Rules creation operations 316 may be performed by rules creation module 216. Rules creation operations 316 may include using the call patterns received, or otherwise obtained, in addition to user preferences set by the user and user settings database 224 to create rules on how to terminate various types of calls. In the example above, rules creation operations 316 may receive information from call pattern analysis operations 314 that the user never answers the phone past 12:00 AM unless it is a business call. The rules creation module 216 may further obtain information from user settings database 224 to determine how the user wants such a call terminated. For example, the user settings database 224 may include instructions from the user requiring that all calls that will automatically not be terminated to user based on past call behavior, play a message back to the caller informing them that they should call back at another time. The rules created by rules creation operations 316 are stored in the rules database 222. Although the call pattern analysis operations 314 and rules creation operations 316 are described as being performed by separate call pattern analysis module 214 and rules creation module 216, these operations may be performed together in a single module to determine calling patterns and rules.

Figure 4:
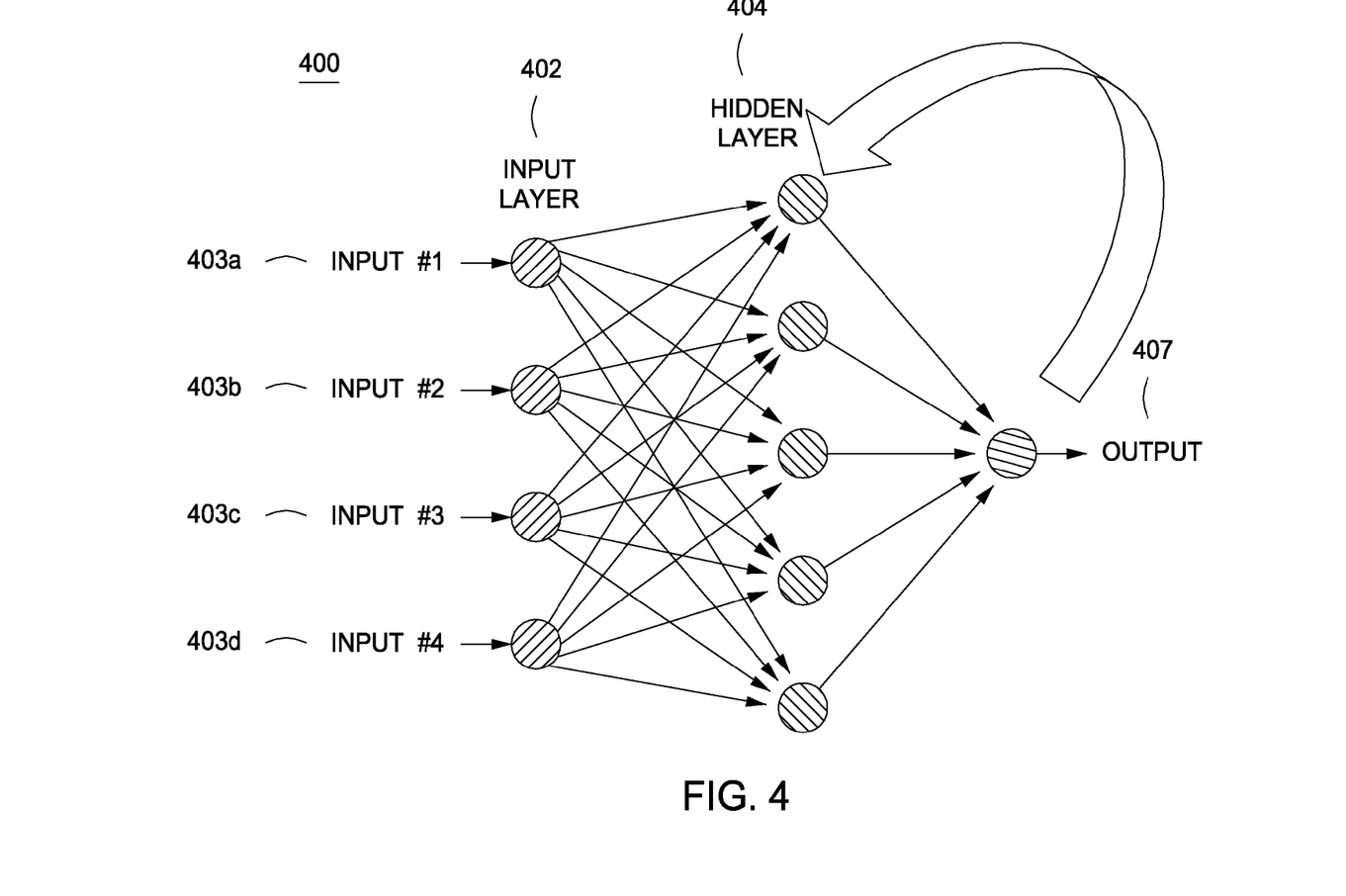
FIG. 4 is an exemplary neural network system that may be used for providing intelligent termination of calls according to one or more embodiments.

Call pattern analysis operations 314 and/or rules creation operations 316 may include the use of neural networks to determine and refine calling patterns and rules. That is, the intelligent call termination system 202 will employ learning algorithms to be used in call pattern analysis operations 314 and rules creation operations 316, to determine user call termination behaviors and create rules associated with the determined behaviors. Specifically, as shown in FIG. 4, an exemplary neural network system 400 that may be used by call pattern analysis operations 314 and rules creation operations 316. The system 400 may include an input layer 402 and includes a plurality of inputs 403a-d. The inputs (variables) that are chosen may include time of day (at the user's location), day of the week, the caller information, whether the caller is in the user's contact book, the user's location, information associated with what the user was doing at the time of the call (e.g., using calendar information or phone mode settings to determine if the user was in a meeting), a device identifier of the device that the call was terminated to and/or answered by the user, and the like. For example, if a phone is set to silent mode or meeting mode, the user may be in a meeting or at the movies. The inputs 403a-d of the input layer 402 are obtained from call history database 220.

The hidden layer 404 operates on the inputs 403a-d of the input layer 402 to provide behavior patterns. Thus, in embodiments consistent with the present invention, the hidden layer 404 is the result of the call pattern analysis operations 314 performed on inputs 403a-d. That is, based on the inputs 403a-d of the input layer 402, the hidden layer 404 includes the determined call termination behaviors of the user as shown in Table 1 below.

The output 407 is the end rule based determined by rules creation operations 316 on the given set of inputs 403a-d and the behavior patterns of the hidden layer 404. For example, Tables 1 and 2 below includes some non-limiting examples of output rules that may be determined by rules creation operations 316 based on the given set of inputs 403a-d and the behavior patterns of the hidden layer 404.

TABLE 1

| Inputs | Hidden Layer Results | Determined Output/Rule |
| --- | --- | --- |
| Monday mornings | Jack always lets the phone ring to voicemail | Monday morning calls should not ring, but go straight to voicemail |
| . . . except if it's Jack's sister, Lisa | Jack picks up sometimes | Keep a normal ring duration if the caller is Jack's sister (e.g., 5-7 rings) |
| . . . except if Jack's in Newark | Jack either picks up immediately or not at all | Keep a short ring duration (e.g., 1-3 rings) |

TABLE 2

| Inputs | Hidden Layer Results | Determined Output/Rule |
| --- | --- | --- |
| Jack has a communication identifier associated with a phone, tablet and a TV | Jack typically uses either phone or tablet to answer call | Terminate call to phone and tablet |

TABLE 2-continued

| Inputs | Hidden Layer Results | Determined Output/Rule |
|---|---|---|
| ... except if it's a video call | Jack answers via TV | Terminate call to TV |
| ... except if Jack is not at home | Jack always answers using phone | Terminate call to phone only |

Initially, while the system 400 is learning, the system 400 might provide the same output (i.e., call termination rule) no matter what the inputs are (e.g., ring for 30 seconds then go to voicemail). However, over time, based on the user's behavior in different circumstances, the system learns the optimal behavior for a given set of circumstances/inputs that resulting in changes in the hidden layer. Feedback based on user's behavior will result in gradual formation and modification of hidden rules. In some embodiments, call termination rules may be suggested to users once the system reaches a threshold level of certainty regarding the given rule. In some embodiments, initial tests are performed to optimize the algorithm and to deduce or estimate how soon can a sufficient certainty level is achieved. For example, the initial tests may indicate that 30 call records would suffice to reach a sufficient initial certainty level/prediction. This number of call records to be used to reach a threshold level of certainty is further optimized dynamically/on-the-fly based on users' reaction and satisfaction. Thus, the rules database 222 may include a certainty level, or rule weighting, associated with each rule.

Returning to FIG. 3, in operation, when a request to establish a call directed to a communication identifier associated with one or more devices of a user (e.g., a mobile computing device 136B, computer 106, TV 109, and the like) is received by call processing module 218, call processing operations 318 are performed on the call to determine how to terminate the call. Call processing operations 318 will use information associated with the call 232, information from user settings database 224 about user, and rules from rules database 222. Call processing operations 318 may first determine if the user to which the call is directed to is a subscriber to the intelligent call termination service by accessing user settings database 224. Call processing operations 318 may then extract in-band information associated with the call 232 to determine if there are any matching rules from rules database 222. Specifically, call processing operations 318 may determine one or more call termination patterns from the information associated with a call request, and match that up with one or more rules from rules database 222. If no matching rules apply, then a default call termination procedure may be used. For example, a default call termination procedure may include terminating the call to the user with a ring duration of five rings, and then sending the call to voicemail after five rings. If call processing operations 318 determines that the incoming call request matches one or more rules in rules database 222, and the call will be terminated to the user associated with device 136B in accordance with the one or more matching rules.

In some embodiments, call processing operations 318 may include obtaining out-of-band information from external sources 234. The external sources 234 from which the out-of-band information is obtained may include, for example, social media sources such as, for example, LINKEDIN, FACEBOOK, and the like. For example, if call processing operations 318 cannot find a matching rule since the calling party cannot be identified, call processing operations 318 may obtain external information from a social media site to determine the user is associated with the calling party. Thus, call processing operations 318 may determine that the calling party is a business associate using LINKEDIN contact information and apply a rule from rules database 222 that pertains to calls from business associates.

Figure 5A:
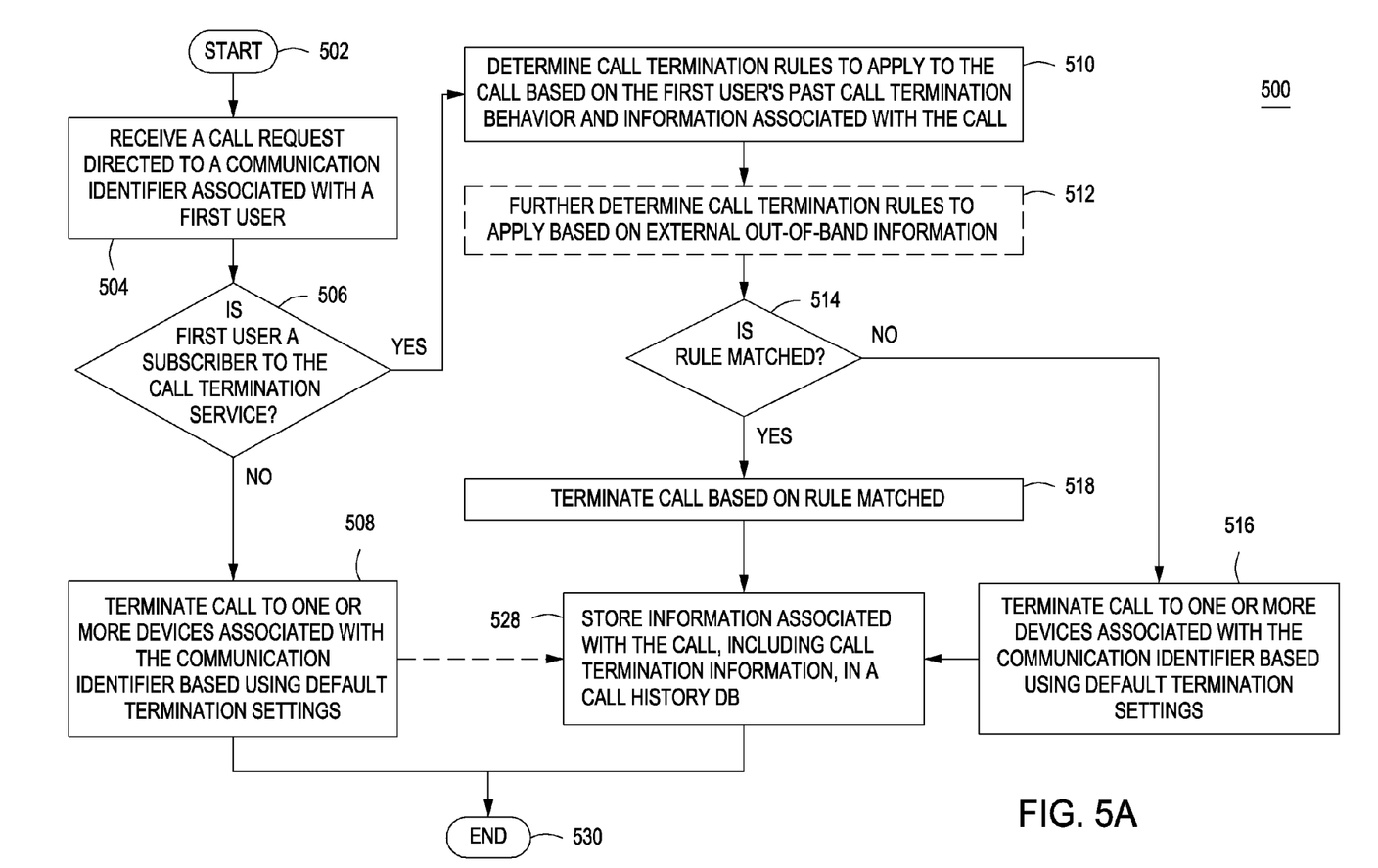
FIGS. 5A and 5B depict a flow diagram of a method for providing intelligent termination of calls based on a user's call history, according to one or more embodiments of the invention.
Figure 5B:
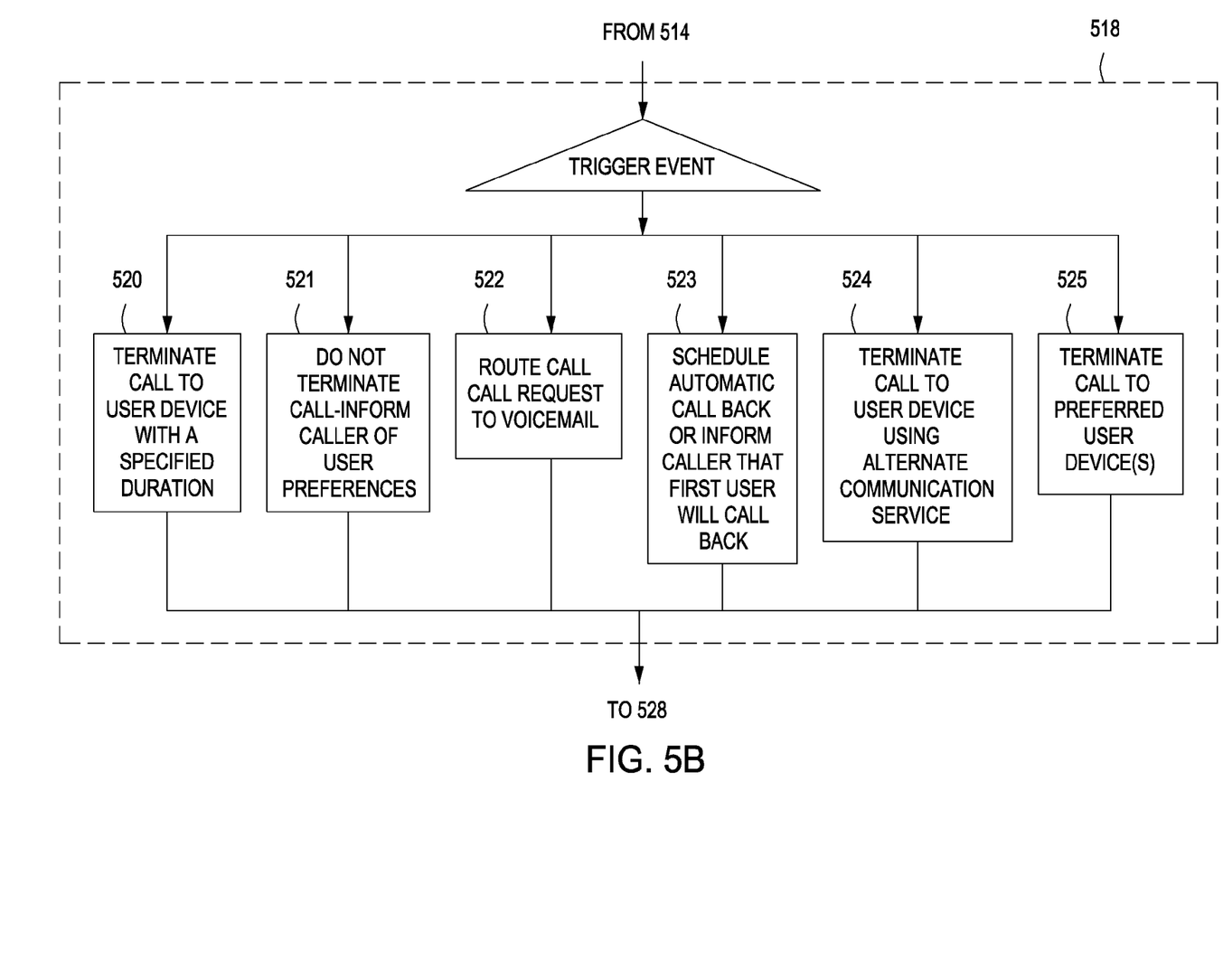

FIGS. 5A and 5B depict a flow diagram of a method 500 for providing intelligent termination of calls based on a user's call history, according to one or more embodiments of the subject invention.

The method begins at 502 and proceeds to 504 where a call request directed to a communication identifier associated with the first user is received. The call request may be in the form of a Session Initiation Protocol (SIP) message, Signaling System No. 7 (SS7) message, or other type of message. In some embodiments, the call request may be received by call processing module 218 of intelligent call termination system 202. The communication identifier may be a phone number associated with one or a plurality of devices used by, or otherwise associated with, the user. At 506, it is determined whether the first user is a subscriber to the call termination service. Call processing module 218 may access user settings database 224 to determine whether the first user is subscribed to the service. If the first user is not a subscriber to the call termination service, the method proceeds to 508 wherein a call is terminated to one or more devices associated with the communication identifier using default call termination settings. The default call termination settings may be set by the service provider for the first user. In some embodiments, the method 500 may proceed to 528 from 508 where the intelligent call termination system optionally stores information associated with the call, including call termination information, in a call history database 220 in association with the first user regardless of whether or not the first user is subscribed to the intelligent call termination service. Otherwise, the method ends at 530.

If, at 506, it is determined that the first user is a subscriber to the call termination service, the method proceeds to 510. At 510, applicable call termination rules are determined based on the first user's past call termination behavior and in-band information associated with the call. Non-limiting examples of in-band information (i.e., collected from the call itself) may include caller identification, time of day/week of the call, user devices available for call termination, location of the user devices available for call termination, type of call (text, video, audio, and the like). Past call termination behavior may include the same in-band information of previous calls in addition to device identifiers of the devices used by the user to answer calls, and the like.

In some embodiments, the method proceeds to 512 where call termination rules may further be determined based on external out-of-band information. As discussed above, external out-of-band information may include information from sources such as social media, GPS location, motion detection sensors that may indicate whether the user is moving (detected that user is driving, for example), information from external calendar sources associated with the user, and the like. In some embodiments, the external information may include "crowd sourcing" information regarding other users call termination behaviors that may be used to determine call termination actions for the current user.

At 514, it is determined if any rules matched information associated with the current incoming call. If no rules matched, the method proceeds to 516 where the call is terminated to one or more devices associated with the communication identifier using default call termination settings. The default call termination settings may be set by the service provider for the first user. Since the first user is a subscriber to the call termination service, the call history information is stored in call history database 220 even if a rule does not match the current call information. The method then proceeds to 528 where information associated with the call is stored in the call history database 220 in association with the first user. That call history information stored in call history database 220 may be used to create and/or dynamically modify call termination rules/algorithms for each user as described below with respect to method 550 of FIG. 5C.

If, at 514, it is determined that one or more rules matched information associated with the current incoming call, the method proceeds to 518 where the call is terminated based on the rule matched. That is, the call termination action associated with the one or more matched rules is applied. FIG. 5B depicts a more detailed flow chart of non-limiting examples of call termination actions that may be applied as described below. Specifically, at 520 of FIG. 5B, the rule action applied to the call may include terminating the call to the user with a specified ring duration. In some embodiments, the ring duration is automatically specified by the call pattern analysis module 214 and/or the rules creation module 216 based on the call pattern analysis operations 314 in rule creation operations 316 described above. The ring duration may be anywhere from zero rings (i.e., vibrate phone) to 30 rings. In some embodiments, the system may default to sending a call to voicemail after 5 or so rings.

At 521, the rule action applied to the call may include not terminating the call to the first user. In addition, in some embodiments, the caller may be informed that the user is not accepting calls at that time. In some embodiments, the caller may be informed of the user's preferences via an audio message, a text message, or by other communication methods. At 522, the rule action applied to the call may include directly routing the call request to voicemail. At 523, the rule action applied to the call may include scheduling an automatic call back from the first user to the caller, or informing the caller that the first user will call them back at a later time.

At 524, the rule action applied to the call may include termination of the call to the user using an alternate communication service. For example, if the first user always attempts to set up a video call when called by the caller, then the rule action applied may include automatically turning the call into a video call. In some embodiments, the call may not be automatically turned into a video call but rather, a request may be sent to the caller suggesting that the call be conducted via video. Similarly, if the first user always ignores a caller's call requests, and instead texts them, the rule action applied may include automatically responding to the caller's call request with a text message from the first user.

At 525, the call termination rule action applied to the call may include selecting which device(s) associated with the user call to terminate the call to. Specifically, some technologies, for example Global System for Mobile Communications (GSM) and SIP, support signaling to multiple destinations. Thus, a single communication identifier may be associated with multiple devices associated with the user devices (e.g., mobile computing device 136$_B$, computer 106, TV 109, and the like). Thus, at 525, the intelligent call termination service may terminate the call to one or more user devices such as mobile computing device 136$_B$, computer 106, TV 109, and the like based on previous call termination behavior determined at step 510 and/or external out of band information at 512 as discussed above. In some embodiments, the call termination rule action applied to the call may include selecting a prioritized list of devices that the call should be terminated to such that if the call terminated to the first device on the list is not answered by the user, the call would be terminated to the second device on the list, and so on. In some embodiments, an indication that the call was not answered by the first device may be received before the call is terminated to the second device. The indication may be an SIP message or an expiration of a predefined timeout period.

Figure 5C:
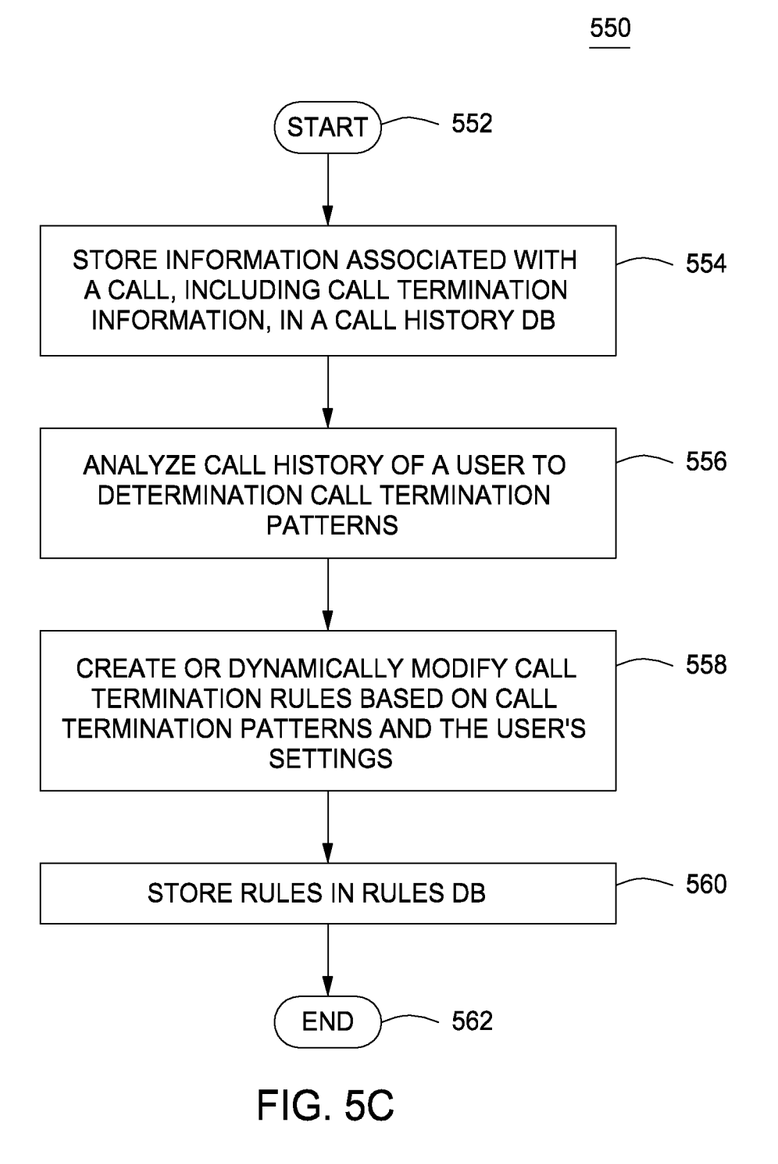
FIG. 5C depicts a flow diagram of a method for obtaining and using a user's call history according to one or more embodiments of the invention.

Referring back to FIG. 5A, after the call is terminated in one of the methods described above, information associated with the call is stored in call history database 220 at 528 to be further analyzed by the call pattern analysis module 214 and rules creation module 216 for use in future calls as described with respect to FIG. 5C. The method ends at 530.

FIG. 5C depicts a flow diagram of a method 550 for storing and using a user's call history information, according to one or more embodiments. The method begins at 552 and proceeds to 554 where information associated with a call, including call termination information, in a call history database 220 (as described above in step 528 of method 500). At 556, the call history information stored in call history database 220 is analyzed to determine call termination patterns (as described above with respect to FIG. 3 and FIG. 4.) At 558, the determined call termination patterns are used to create new call termination rules. In some embodiments, the determined call termination patterns are used to dynamically modify existing call termination rules. The call termination rules are stored in rules database 222 at 560. The method 550 ends at 562.

The embodiments of the present invention may be embodied as methods, apparatus, electronic devices, and/or computer program products. Accordingly, the embodiments of the present invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 6:
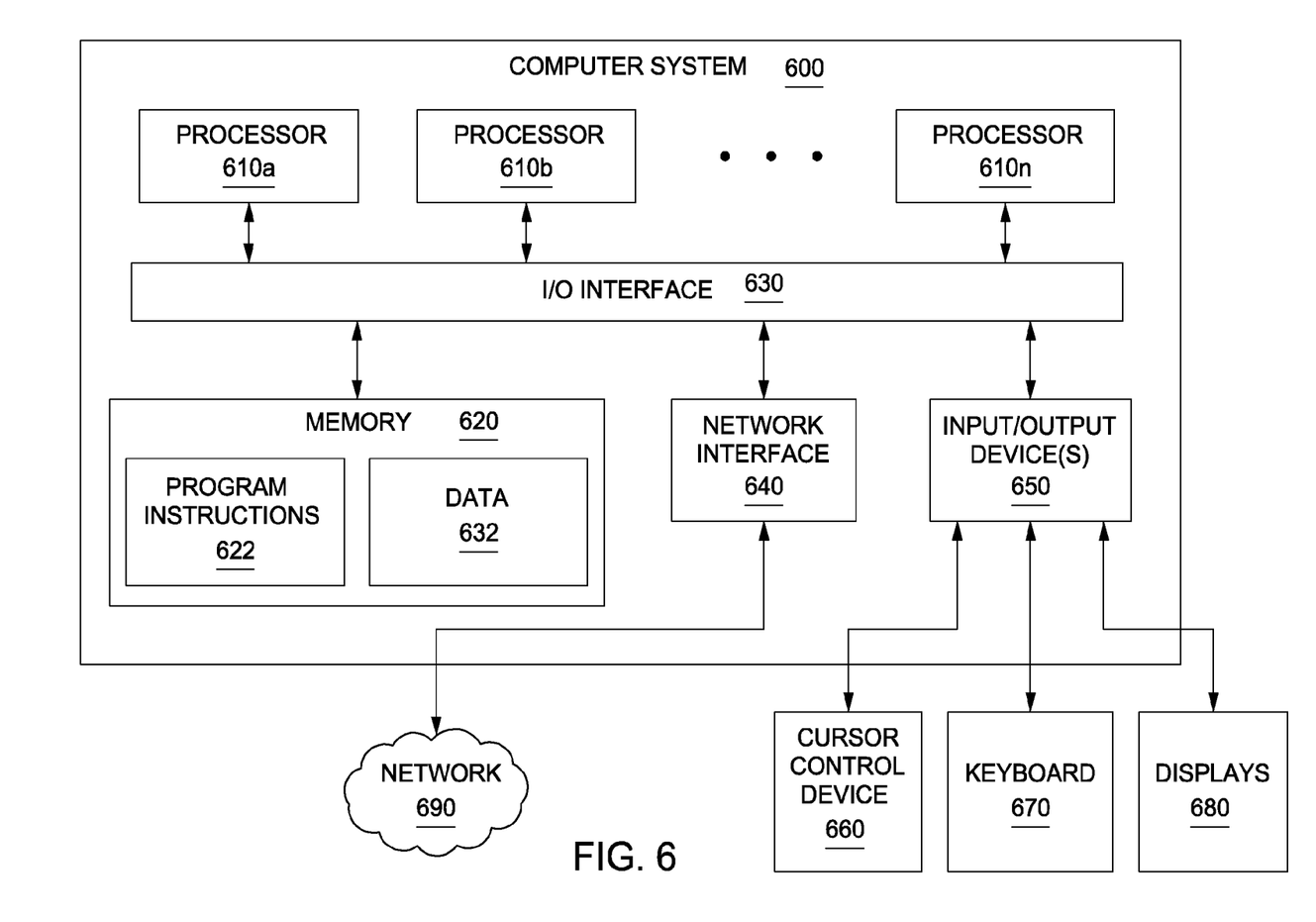
FIG. 6 depicts a computer system that can be utilized in various embodiments of the present invention, according to one or more embodiments of the invention.

FIG. 6 depicts a computer system 600 that can be utilized in various embodiments of the present invention to implement the computer and/or the display, according to one or more embodiments.

Various embodiments of method and apparatus for organizing, displaying and accessing contacts in a contact list, as described herein, may be executed on one or more computer systems, which may interact with various other devices. One such computer system is computer system 600 illustrated by FIG. 6, which may in various embodiments implement any of the elements or functionality illustrated in FIGS. 1-5C. In various embodiments, computer system 600 may be configured to implement methods described above. The computer system 600 may be used to implement any other system, device, element, functionality or method of the above-described embodiments. In the illustrated embodiments, computer system 600 may be configured to implement methods 500 and 550 as processor-executable executable program instructions 622 (e.g., program instructions executable by processor(s) 610) in various embodiments.

In the illustrated embodiment, computer system 600 includes one or more processors 610a-610n coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In various embodiments, any of the components may be utilized by the system to receive user input described above. In various embodiments, a user interface may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the operations and methods described above, such as the operations described with respect to FIG. 3 and the methods illustrated by the flowcharts of FIGS. 5A-5C. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for intelligently terminating calls, comprising:
   receiving a call request directed to a communication identifier associated with a first user;
   determining a call termination action to associate with the call request based on (a) information associated with the call request and (b) previous call termination patterns associated with the first user, wherein the previous call termination patterns are based on an analysis of a plurality of call history records that the first user is associated with; and
   terminating the call to one or more devices associated with the communication identifier based on the determined call termination action, wherein the call termination action associated with the call request includes terminating the call to the first user with a specified ring duration, wherein the specified ring duration is determined based on previous call termination patterns by the first user.

2. The method of claim 1, wherein each call history record includes information regarding a call including at least one of a time of the call, a device ID of a device associated with the communication identifier that the call was terminated to, a location of a device associated with the communication identifier that the call was terminated to when the call request was received, an identification of a caller that initiated the call request, a ring duration of the call that was established, an indication that the call was answered or not answered, or an indication that the call was sent directly to voicemail.

3. The method of claim 1, further comprising:
   storing the information associated with the call request in a call history database.

4. The method of claim 1, wherein the information associated with the call request includes at least one of time of the call, day of week of the call, an indication that the call is a video or voice call, or identification information of a caller that initiated the call request.

5. The method of claim 1, wherein determining the call termination action to associate with the call request is further based on information associated with the first user.

6. The method of claim 5, wherein the information associated with the first user includes at least one of an indication as to whether the first user is subscribed to a call termination service, an indication as to whether an identification of a caller that initiated the call request is in an address book associated with the first user, types of the one or more devices, locations of one or more devices, communications settings of the one or more devices, or calendar information of the first user.

7. The method of claim 1, wherein the call request received is a Session Initiation Protocol (SIP) message.

8. The method of claim 1, wherein determining the call termination action to associate with the call request is further based on external information from third party services.

9. The method of claim 8, wherein the external information from third party services includes at least one of Global Positioning Satellite (GPS) information from GPS services, information for social media services, or information from external calendar sources associated with the first user.

10. The method of claim 1, wherein the previous call termination patterns are determined via a neural network.

11. The method of claim 10, wherein determining the call termination action to associate with the call request includes comparing the information associated with the call request and rules created from the previous call termination patterns by the first user.

12. The method of claim 1, wherein the call termination action associated with the call request includes at least one of not terminating the call to the first user, informing a caller that initiated the call request that the user is not accepting calls at that time, directly routing the call request to voicemail, scheduling an automatic call back from the first user to the caller, or informing the caller that the first user will call the caller back at a later time.

13. The method of claim 1, wherein the communication identifier is associated with a plurality of devices, and wherein determining the call termination action to associate with the call request includes selecting one or more of the plurality of devices to terminate the call to.

14. The method of claim 13, wherein the one or more devices are selected as terminating devices based on an analysis of device identifiers of devices that previous calls directed to the communication identifier were terminated to.

15. The method of claim 13, wherein a first device of the plurality of devices is selected to terminate the call to.

16. A method for intelligently terminating calls, comprising:
receiving a call request directed to a communication identifier associated with a first user;
determining a call termination action to associate with the call request based on (a) information associated with the call request and (b) previous call termination patterns associated with the first user, wherein the previous call termination patterns are based on an analysis of a plurality of call history records that the first user is associated with, wherein the communication identifier is associated with a plurality of devices, wherein determining the call termination action to associate with the call request includes selecting one or more of the plurality of devices to terminate the call to, and wherein a first device of the plurality of devices is selected to terminate the call to;
terminating the call to one or more devices associated with the communication identifier based on the determined call termination action;
receiving an indication that the call terminated to the first device was not answered; and
selecting a second device of the plurality of devices to terminate the call to.

17. A system for intelligently terminating calls, comprising:
a call pattern analysis circuit configured to determine call termination patterns of a first user based on an analysis of past call history records associated with the first user;
a rules creation circuit configured to create one or more rules based on the call termination patterns determined by the call pattern analysis; and
call processing circuit configured to determine a call termination action for a received call request directed towards a device associated with the first user based on (a) information associated with the call request and (b) the one or more rules created, wherein the call termination action associated with the call request includes terminating the call to the first user with a specified ring duration, wherein the specified ring duration is determined based on previous call termination patterns by the first user.

18. The system of claim 17, further comprising:
a call history database that stores past call history records associated with the first user;
a rules database that stores the rules created by the rules creation circuit; and
a user settings database that stores information associated with user.

19. The system of claim 17, the call pattern analysis circuit includes a neural network configured to determine call termination patterns of a first user based on past call history records associated with the first user.

\* \* \* \* \*